Patented Sept. 9, 1941

2,255,409

UNITED STATES PATENT OFFICE 2,255,409

CYCLOPENTADIENE RESIN

William H. Carmody, Pittsburgh, Pa., assignor to The Neville Company, Pittsburgh, Pa., a corporation of Pennsylvania No Drawing. Application May 21, 1938, Serial No. 209,370

3 Claims. (Cl. 260—80)

This invention relates to the production of resins by the polymerization of cyclopentadiene.

Cyclopentadiene can be polymerized, as is known, with production of both oily and resinous polymers. Substantial amounts of cyclopentadiene are carried in crude benzol fores, and although the fores may contain small amounts of other polymerizable constituents, it is generally considered that the polymerizable content consists of cyclopentadiene, which may amount to as much as 60 per cent by weight of the fores. Because of the availability of cyclopentadiene in such crude fores, reference will be made hereinafter to such fores in explaining the invention although it will be understood that they merely provide a convenient and available source of cyclopentadiene in solution for use in the practice of this invention.

The cyclopentadiene in benzol fores may be polymerized in accordance with various procedures, and by the various polymerizing catalysts, known in the art, with production of homologous polymers ranging from a liquid, or oily, dimer to a resin polymer of extremely high molecular weight. When polymerization is effected with sulfuric acid as the catalyst the amount of polymer obtained is always less than corresponds to the unsaturates present in the fores. For this reason the use of sulfuric acid as a catalyst in the polymerization of cyclopentadiene in benzol fores is uneconomical and impractical.

Aluminum chloride, one of the well known polymerization catalysts and one typical of the class of chlorides known for polymerizing unsaturated organic compounds, produces polymerization of the entire content of cyclopentadiene in crude benzol fores, but its use is likewise subject to disadvantages. Two types of polymer are produced with aluminum chloride. One portion of the polymerized product appears as a relatively small amount of soluble resin of reddish amber color whose melting point is definitely limited to not over about 75° C. The remainder, constituting the major portion of the product, appears as a polymer which is insoluble in solvents. If this latter portion be heated in the presence of one of the common solvents, such as benzene, toluene, ethyl acetate, alcohol, aniline, and the like, it appears to go into solution, but this is due to depolymerization of the resin so that the solution is, obviously, not a solution of the original high polymer.

Much work has been done in an attempt to polymerize cyclopentadiene with production of greater yields of soluble resin, and to produce satisfactorily high melting point of the soluble resin. For instance, it has been proposed to modify the intensity of the polymerizing reaction. Although such procedures have increased the proportion of soluble resin, this has been accomplished at the expense of the melting point of the polymer, and in general the melting points of polymers produced in this manner have not been high enough to permit their use for most purposes for which such materials are adapted. Another proposal has been to effect the polymerization in the presence of an olefine which, however, likewise gives rise to soft resins because in general the olefines do not produce resins, but rather viscous oils.

As exemplifying this, 1000 cc. of benzol fores containing about 60 per cent of cyclopentadiene were placed in a vessel and cooled with ice to about 2° C. While agitating continuously there were added 50 grams of aluminum chloride while maintaining the temperature below about 20° C., the catalyst being added over a period of about one hour. Agitation was continued for about five hours longer, at the end of which time the material was nearly solid. 2000 cc. of benzol were added to disintegrate and disperse the material, and the mixture was then neutralized with alcoholic ammonium hydroxide, after which it was filtered to separate the soluble polymer, carried by the filtrate, from the insoluble polymer, which was retained in the filter cake. Distillation of the solvent from the filtrate gave 160 grams of soluble resin. The filter cake was washed with benzol to remove any residue of soluble resin, dried to evaporate residual benzol, and treated with dilute hydrochloric acid to remove its content of aluminum hydroxide and ammonium chloride. After drying there were obtained 317 grams of resin insoluble in all known solvents, and infusible without decomposition. This is characteristic of the results obtained according to procedures generally known in the art, and it will be noted that the insoluble resin in this experiment, which is essentially a waste material, constituted approximately two-thirds of the total yield of resin.

In consequence of such factors the art has lacked a method of satisfactorily polymerizing cyclopentadiene, for example as occurring in crude benzol fores, with production of acceptably economical yields of soluble resin of adequately high melting point.

It is among the objects of the present invention to provide a method of polymerizing cyclopentadiene, especially in crude benzol fores, whereby to obtain increased yields of soluble resin of improved melting point, as contrasted with prior art practice, by a procedure that efficiently produces a maximum yield of polymer, is simple, inexpensive, and uncomplicated.

The invention is predicated upon my discovery that its stated objects are attained by subjecting cyclopentadiene to polymerizing conditions in the presence of a benzene derivative having an unsaturated bond in its structure. I have discovered that under such conditions the whole, or substantially the whole, of the cyclopentadiene present is obtained in the form of a resin that is not only of suitably high melting point, but also is soluble in commonly used solvents.

Although the polymerization may be effected in accordance with various procedures known in the art, it is preferred in the practice of the invention to effect the polymerization with aluminum chloride, which will consequently be referred to hereinafter in specific illustration of the invention.

As unsaturated benzene derivatives there may be used, with especially desirable results, the polymerizable constituents present in crude solvent naphtha, or polymers of such constituents. In general, the polymerizable constituents of crude solvent naphtha consist predominantly of indene and coumarone.

A substantial amount of heat is liberated during the polymerization, and for the best results I now believe it to be desirable to abstract heat to prevent undue temperature rise. For example, good results are to be had by cooling the solution to an extent such that its temperature does not exceed about 20° C.

The invention will be understood in further detail by the actual tests now to be described.

In one test 150 cc. of crude solvent naphtha were mixed with 100 cc. of benzol fores, and the mixture was cooled to below 20° C. Polymerization was then effected by the slow addition of 15 grams of aluminum chloride over an interval of about 30 minutes, the mixture being continuously cooled in ice water and agitated vigorously. Agitation was continued for a total period of about three hours, when the mixture was neutralized with alcoholic ammonia, the resultant precipitate being then removed by filtration. The filtrate was distilled to remove the unreacted solvent and recover the soluble polymer. The resin thus obtained weighed 108 grams, exhibited a melting point of 167° C., and had a color of 5 on the color scale used by The Neville Company, Neville Island, Pittsburgh, Pennsylvania. This resin was satisfactorily soluble in the commonly used solvents, and no insoluble polymer was found in the filter cake. No oily polymers were produced as a result of steam distillation of the resin. While the full yield of polymer was not produced, this test demonstrates that polymerization of the polymerizable constituents of benzol fores in the presence of the polymerizable constituents of crude solvent naphtha results in the production of soluble resin of high melting point, to the exclusion of insoluble polymer.

In the practice of the present invention there may be used also polymers of the unsaturated constituents of crude solvent naphtha. In the polymerization of such constituents there is normally produced a proportion of the lower polymers, chiefly the dimers and trimers, which are of liquid, or oily, nature, and which consequently do not find widespread application. This material is known in the trade as "heavy oil." I have discovered that such heavy oil may be used to advantage in the practice of the present invention, not only as a source of modifying polymer, but also to permit utilization of what is otherwise a more or less waste material.

As exemplifying this aspect of the invention, in one test 150 cc. of crude No. 1 heavy oil were mixed with 150 cc. of benzol fores and treated as described in the preceding test. This resulted in 90 grams of soluble resin having a melting point of 115° C., and a color of about 8. No oily polymer was found by steam distillation, which is striking in view of the fact that crude No. 1 heavy oil is itself oily in nature and is generally considered to be incapable of polymerization.

It is not known whether or not the polymerizable constituents of crude solvent naphtha, or their polymers, actually react with the cyclopentadiene, or otherwise, during the polymerization, and because the crude solvent naphtha contains both indene and coumarone, it is not known whether both or one alone influences, or modifies, the resultant polymer in the manner which characterizes the present invention. In the test made with crude heavy oil the yield of resin, based upon the assumption that the heavy oil is a mere diluent and unreactive, exceeds the possible yield from the fores by about 20 grams. On the same assumption it is implied that the melting point of the cyclopentadiene polymers is very high, say above about 175° C., thus allowing 20 grams of heavy oil to be included while producing fairly high melting point. On the other hand, no oily polymer was detected and if it be assumed that both materials react, the total yield of resin is only about 40 per cent of that theoretically attainable. However, since it is known that aluminum chloride achieves polymerization of all of the cyclopentadiene present in benzol fores, the most logical assumption is that the polymerizable constituents of crude solvent naphtha, and their polymers, such as heavy oil, act largely as a diluent, rather than being reactive.

In another test, conducted in the same manner, there were used 240 cc. of benzol fores, and 60 cc. of heavy oil. This yielded 98 grams of soluble resin whose melting point was 105° C., and with a color of 7 to 8. Again, no insoluble polymer was found. Based on the fores only, the yield was 88 per cent.

In still another experiment, 210 cc. of fores and 90 cc. of heavy oil were polymerized in the same manner, producing 118 grams of soluble polymers with a melting point of 78° C. and a color of 8, to the exclusion of soluble polymer as in the foregoing tests. Based on the fores, the full yield of resin was obtained, with an average of about 20 grams arising from the inclusion of heavy oil. This apparent increased yield due to increase in the ratio of catalyst to fores material, is real, and it indicates that the net yield is proportional to the catalyst used, up to the point where maximum yield is found.

It thus appears that substantial benefits flow from the present invention. It provides a means of utilizing benzol fores, or cyclopentadiene, for the production of commercially desirable resins. In accordance with the invention the maximum yield of resins is obtained, the resins possess adequately high melting point, and no insoluble, or waste, resin, is produced. Also, the invention makes possible the utilization of heavy oil or similar more or less waste material. Other advantages will appear to those skilled in the art.

According to the provisions of the patent statutes, I have explained the principle and manner of practicing my invention, and have described what I now consider to be its best embodiment. However, I desire to have it understood that, within the scope of the appended claims, the invention may be practiced otherwise than as specifically described.

I claim:

1. That method of making synthetic resin which comprises adding to benzol fores containing cyclopentadiene an agent of the group consisting of polymerizable constituents of crude solvent naphtha and polymer of said constituents, agitating said solution while adding slowly aluminum chloride in an amount to cause polymerization of said cyclopentadiene and during such addition maintaining the temperature not over about 20° C., and separating residual aluminum chloride from the polymerized product.

2. That method of polymerizing cyclopentadiene which comprises mixing a main body of cyclopentadiene with heavy oil comprising oily polymers produced in polymerization of the polymerizable constituents of crude solvent naphtha, adding aluminum chloride to the mixture, abstracting heat during the reaction caused by said addition to prevent substantial rise in temperature in the reaction body, and thereafter separating the aluminum chloride from the polymerized product.

3. That method of making cyclopentadiene resin which comprises mixing a main body of cyclopentadiene with heavy oil comprising oily polymers produced in polymerization of the polymerizable constituents of crude solvent naphtha to form a solution thereof, agitating said solution while slowly adding aluminum chloride in an amount to cause polymerization of said cyclopentadiene and during such addition abstracting heat to avoid substantial elevation in temperature of the solution, and separating residual aluminum chloride from the polymerized product.

WILLIAM H. CARMODY.